US011123611B2

(12) United States Patent
Shindo et al.

(10) Patent No.: US 11,123,611 B2
(45) Date of Patent: Sep. 21, 2021

(54) RUBBER COMPOSITION FOR GOLF BALL, AND GOLF BALL

(71) Applicant: BRIDGESTONE SPORTS CO., LTD, Tokyo (JP)

(72) Inventors: Jun Shindo, Chichibushi (JP); Daisuke Arai, Chichibushi (JP)

(73) Assignee: BRIDGESTONE SPORTS CO., LTD, Tokyo (JP)

( * ) Notice: Subject to any disclaimer, the term of this patent is extended or adjusted under 35 U.S.C. 154(b) by 0 days.

(21) Appl. No.: 16/448,173

(22) Filed: Jun. 21, 2019

(65) Prior Publication Data

US 2020/0001143 A1 Jan. 2, 2020

(30) Foreign Application Priority Data

Jun. 27, 2018 (JP) .............................. JP2018-121983

(51) Int. Cl.
| | | |
|---|---|---|
| *C08K 5/378* | (2006.01) | |
| *C08K 5/05* | (2006.01) | |
| *C08K 5/053* | (2006.01) | |
| *C08L 9/00* | (2006.01) | |
| *A63B 37/04* | (2006.01) | |
| *A63B 37/00* | (2006.01) | |
| *C08F 36/06* | (2006.01) | |
| *C08K 5/14* | (2006.01) | |
| *C08K 5/13* | (2006.01) | |

(52) U.S. Cl.
CPC ...... *A63B 37/0051* (2013.01); *A63B 37/0063* (2013.01); *A63B 37/0096* (2013.01); *C08F 36/06* (2013.01); *C08K 5/05* (2013.01); *C08K 5/053* (2013.01); *C08K 5/13* (2013.01); *C08K 5/14* (2013.01); *C08K 5/378* (2013.01); *A63B 37/0053* (2013.01); *A63B 37/0074* (2013.01); *A63B 37/0075* (2013.01); *A63B 37/0076* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 4,837,274 A | * | 6/1989 | Kawakubo ............. C08G 18/10 524/265 |
| 8,962,720 B2 | | 2/2015 | Ozawa et al. |
| 10,279,218 B2 | | 5/2019 | Watanabe et al. |
| 2003/0208000 A1 | * | 11/2003 | Higuchi ................. C08L 51/04 525/274 |
| 2013/0131234 A1 | | 5/2013 | Ozawa et al. |
| 2013/0131236 A1 | * | 5/2013 | Ozawa ..................... C08K 5/09 524/106 |
| 2015/0065268 A1 | * | 3/2015 | Nakajima ............ A63B 37/006 473/373 |
| 2018/0118918 A1 | * | 5/2018 | Mikura .............. A63B 37/0051 |
| 2019/0290971 A1 | * | 9/2019 | Kimura .............. A63B 37/0076 |

FOREIGN PATENT DOCUMENTS

| | | | |
|---|---|---|---|
| JP | 11-169485 A | | 6/1999 |
| JP | 11169485 | * | 6/1999 |
| JP | 2013-108079 A | | 6/2013 |
| JP | 2013-108080 A | | 6/2013 |
| JP | 2015-047502 A | | 3/2015 |

* cited by examiner

*Primary Examiner* — David J Buttner
(74) *Attorney, Agent, or Firm* — Sughrue Mion, PLLC

(57) ABSTRACT

A rubber composition for golf balls includes (a) a base rubber, (b) a co-crosslinking agent which is an α,β-unsaturated carboxylic acid and/or a metal salt thereof, (c) an organic peroxide, (d) water or an alcohol, and (e) an antioxidant which is a benzoimidazole of the following general formula and/or a metal salt thereof. When the rubber composition is used in constituent members of a golf ball, especially the core, the golf ball exhibits low spin properties on shots, resulting in an improved flight performance and enabling a good durability to be maintained.

8 Claims, No Drawings

RUBBER COMPOSITION FOR GOLF BALL, AND GOLF BALL

CROSS-REFERENCE TO RELATED APPLICATION

This non-provisional application claims priority under 35 U.S.C. § 119(a) on Patent Application No. 2018-121983 filed in Japan on Jun. 27, 2018, the entire contents of which are hereby incorporated by reference.

TECHNICAL FIELD

The present invention relates to a rubber composition for golf balls, and to a golf ball in which the composition is used. More particularly, the invention relates to a rubber composition for golf balls which can be suitably used as the core material in golf balls having a core of one or more layer and a cover of one or more layer, and to a golf ball in which such a composition is used.

BACKGROUND ART

Golf balls lately are predominantly either two-piece solid golf balls or three-piece solid golf balls. These golf balls generally have a structure in which a cover of one layer or a plurality of layers that is made of various resin materials encases a core made of a rubber composition. The core accounts for most of the golf ball volume and exerts a large influence on ball properties such as rebound, feel on impact and durability. Recently, a number of disclosures have been made in which the cross-sectional hardness of the core is suitably adjusted so as to achieve a specific core hardness gradient, thereby optimizing the spin properties of the ball on full shots with a driver or an iron and enabling the ball to travel an increased distance. Enlarging the hardness difference between the core surface and core center is known have the effect of reducing the spin rate on full shots with a driver. Moreover, it is known from prior findings that a reduced spin rate on full shots leads to an increased distance. Accordingly, in order to improve the distance traveled by a golf ball, there is a desire for art that enlarges the hardness difference at the core interior. One approach that has been proposed for achieving this aim is to give the core a structure made of two rubber layers. However, producing such a core would entail a relatively large number of operations compared with a single-layer rubber core, and so there remains a desire for art that enlarges the hardness difference within a single-layer core.

Methods for adjusting the cross-sectional hardness of the core include, for example, suitably adjusting the compounding ingredients in the core rubber composition and the vulcanization temperature and time. Alternatively, with regard to the compounding ingredients in the core rubber composition, another method involves carefully selecting the types of co-crosslinking agent and organic peroxide used and adjusting their contents. In terms of co-crosslinking agents, the use of methacrylic acid, acrylic acid and metal salts thereof is known in the field of golf balls. However, adjustment in the compounding of such co-crosslinking agents is intended primarily to modulate the feel of the ball on impact by regulating the core hardness, and is incapable of satisfying the desired spin properties.

JP-A H11-169485 discloses art in which a specific amount of polyethylene glycol is included in a core-forming rubber composition. However, the object of this prior art is to improve the mold releasability of a rubber molding (core) by including polyethylene glycol as an internal mold release agent. It is not aimed at further improving the internal hardness of a rubber molding and the spin-lowering effect on a golf ball by judicious selection of the types of compounding ingredients used in a core-forming rubber composition.

JP-A 2013-108079 and JP-A 2013-108080 describe art in which, as a result of investigations on various additives included in rubber compositions for golf balls, the resilience of a vulcanized/molded rubber material is increased and suitable hardness is imparted by the addition of a specific benzoimidazole such as 2-mercaptobenzoimidazole. However, such rubber compositions are not art aimed at improving the internal hardness of rubber moldings and lowering the spin rate of golf balls.

JP-A 2015-47502 discloses art in which, by including water and/or a metal monocarboxylate in the base rubber of a rubber composition for golf ball cores, the distance traveled by the ball can be increased by maintaining a good ball rebound and lowering the spin rate, in addition to which the ball has an excellent durability. However, even in this art, the golf ball spin rate-lowering effect is inadequate. Hence, there remains room for improvement in the spin rate-lowering effect.

SUMMARY OF THE INVENTION

It is therefore an object of the present invention to provide a rubber composition for golf balls which sets the hardness difference in the hardness profile at the interior of a golf ball core to a large value while maintaining a desired core hardness and is thereby able to manifest low spin properties on golf ball shots and improve the flight performance of the ball, and is also able to maintain a good ball durability. A further object of the invention is to provide a golf ball made using this rubber composition.

As a result of extensive investigations, we have discovered that, by having a rubber composition for a golf ball core include as the essential compounding ingredients (a) a base rubber, (b) a co-crosslinking agent that is an $\alpha,\beta$-unsaturated carboxylic acid and/or a metal salt thereof, (c) an organic peroxide, (d) water or an alcohol, and (e) an antioxidant that is a benzoimidazole of a specific formula and/or a metal salt thereof, the hardness difference in the hardness profile at the interior of the core can be set to a large value while maintaining a desired core hardness, enabling low spin properties to be fully manifested on golf ball shots and also enabling a good durability to be maintained. The reason for this, although not entirely clear, is thought to be as follows.

By including water or an alcohol and also, as an antioxidant, a specific benzoimidazole and/or a metal salt thereof in the core material, a large disparity arises between the vicinity of the core surface and the vicinity of the core center in the promotion of organic peroxide decomposition within the core formulation. As a result, disparities can be created in the crosslinked structure of the butadiene rubber. The decomposition efficiency of the organic peroxide within the core-forming rubber composition is known to change with temperature; starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. When water or an alcohol is added to the core, it is thought that the hydroxyl groups on the water or alcohol promote decomposition of the organic peroxide, making it possible to vary radical reactions like those described above at the core center and the core surface. That is, decomposition of the organic peroxide is further promoted near the center of the core, bringing about greater radical deactivation, which leads to a further decrease in the amount of active radicals, presumably enabling a core having a low crosslink density near the core center to be obtained. By including in the core material a specific benzoimidazole and/or a metal salt thereof as an antioxidant, efficient crosslinking reactions are promoted near the core surface, resulting in the formation of a layer having a high crosslink density and a high hardness and thus, it is presumed, making it possible to obtain a core which, for the core as a whole, has a large hardness difference between the core surface and the core center and an excellent durability to impact.

Accordingly, in a first aspect, the invention provides a rubber composition for golf balls that includes (a) a base rubber, (b) a co-crosslinking agent which is an α,β-unsaturated carboxylic acid and/or a metal salt thereof, (c) an organic peroxide, (d) water or an alcohol, and (e) an antioxidant which is a benzoimidazole of the following general formula (1) and/or a metal salt thereof

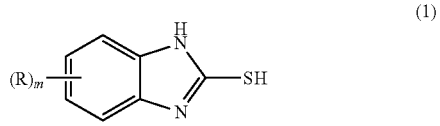

(1)

(wherein R is a hydrogen atom or a hydrocarbon group of 1 to 20 carbon atoms and m is an integer from 1 to 4, with each R being the same or different when m is 2 or more). In a preferred embodiment of the rubber composition of the invention, component (d) is an alcohol. The alcohol is preferably a monohydric, dihydric or trihydric alcohol, and more preferably is butanol, glycerol, ethylene glycol or propylene glycol.

In another preferred embodiment of the invention, component (d) is water.

The amount of component (d) included is preferably from 0.5 to 5 parts by weight per 100 parts by weight of component (a).

In the rubber composition of the invention, component (e) is preferably selected from the group consisting of 2-mercaptobenzoimidazole, 2-mercaptomethylbenzoimidazole, and metal salts thereof.

In another preferred embodiment, the rubber composition further includes (f) an antioxidant differing from component (e), which component (f) is preferably a hindered phenol-type antioxidant.

In yet another preferred embodiment, the rubber composition further includes (g) an organosulfur compound.

In a further preferred embodiment, the rubber composition, in a vulcanized form thereof, is a constituent member of a golf ball.

The vulcanized rubber composition preferably has a surface and a center with a hardness difference therebetween of at least 25 on the JIS-C hardness scale.

In a second aspect, the invention provides a golf ball having a core of one or more layers, wherein part or all of the constituent core layers is made of a vulcanizate of the rubber composition according to the first aspect of the invention.

Advantageous Effects of the Invention

When the rubber composition of the invention is used in constituent members of a golf ball, especially the core, the golf ball exhibits low spin properties on shots, resulting in an improved flight performance and enabling a good durability to be maintained.

DESCRIPTION OF THE PREFERRED EMBODIMENTS

The objects, features and advantages of the invention will become more apparent from the following detailed description.

The rubber composition for golf balls of the invention is characterized by including the following components:
(a) a base rubber,
(b) a co-crosslinking agent which is an α,β-unsaturated carboxylic acid and/or a metal salt thereof,
(c) an organic peroxide,
(d) water or an alcohol, and
(e) an antioxidant which is a benzoimidazole of a specific formula and/or a metal salt thereof.

The base rubber serving as component (a) is not particularly limited, although it is especially suitable to use a polybutadiene.

It is desirable for the polybutadiene to have, in the polymer chain thereof, a cis-1,4 bond content of at least 60%, preferably at least 80%, more preferably at least 90%, and most preferably at least 95%. When cis-1,4 bonds account for too few of the bonds on the polybutadiene molecule, the resilience may decrease.

The content of 1,2-vinyl bonds on the polybutadiene is generally 2% or less, preferably 1.7% or less, and more preferably 1.5% or less, of the polymer chain. When the content of 1,2-vinyl bonds is too high, the resilience may decrease.

The polybutadiene has a Mooney viscosity ($ML_{1+4}$ (100° C.)) of preferably at least 20, and more preferably at least 30. The upper limit is preferably not more than 120, more preferably not more than 100, and even more preferably not more than 80.

The term "Mooney viscosity" used herein refers to an industrial indicator of viscosity (JIS K 6300) measured with a Mooney viscometer, which is a type of rotary plastometer. This value is represented by the unit symbol $ML_{1+4}$ (100° C.), wherein "M" stands for Mooney viscosity, "L" stands for large rotor (L-type) and "1+4" stands for a pre-heating time of 1 minute and a rotor rotation time of 4 minutes. The "100° C." indicates that measurement was carried out at a temperature of 100° C.

The polybutadiene used may be one synthesized with a rare-earth catalyst or a group VIII metal compound catalyst.

A polybutadiene rubber synthesized with a catalyst differing from the above lanthanum rare-earth compound may be included in the base rubber. In addition, styrene-butadiene rubber (SBR), natural rubber, polyisoprene rubber, ethylene-propylene-diene rubber (EPDM) or the like may also be included. These may be used singly or two or more may be used in combination.

The polybutadiene accounts for a proportion of the overall rubber that is preferably at least 60 wt %, more preferably at least 70 wt %, and most preferably at least 90 wt %. The above polybutadiene may account for 100 wt % of the base rubber; that is, it may account for all of the base rubber.

Next, component (b) is a co-crosslinking agent, this being an α,β-unsaturated carboxylic acid and/or a metal salt thereof. The number of carbon atoms on this unsaturated carboxylic acid is preferably from 3 to 8. Specific examples include unsaturated carboxylic acids such as acrylic acid, methacrylic acid, maleic acid and fumaric acid. Specific examples of the metal in the metal salts of these unsaturated carboxylic acids include zinc, sodium, magnesium, calcium and aluminum, with zinc being especially preferred. The co-crosslinking agent is most preferably zinc acrylate.

The content of component (b) per 100 parts by weight of the base rubber serving as component (a) is preferably at least 10 parts by weight, more preferably at least 15 parts by weight, and even more preferably at least 20 parts by weight. The upper limit is preferably not more than 65 parts by weight, more preferably not more than 60 parts by weight, and even more preferably not more than 55 parts by weight. At a content lower than this range, the ball may be too soft and have a poor rebound. At a content higher than this range, the ball may be too hard, resulting in a poor feel on impact, and may also be brittle and thus have a poor durability.

The co-crosslinking agent serving as component (b) has a mean particle size of preferably from 3 to 30 μm, more preferably from 5 to 25 μm, and even more preferably from 8 to 15 μm. At a mean particle size for the co-crosslinking agent that is below 3 μm, the co-crosslinking agent tends to agglomerate within the rubber composition, leading to a rise in reactivity between molecules of acrylic acid and a decline in reactivity between molecules of the base rubber, as a result of which the golf ball may be unable to achieve a sufficient rebound performance. At a mean particle size for the co-crosslinking agent in excess of 30 μm, the co-crosslinking agent particles become too large, increasing the variability in the properties of the resulting golf balls.

Component (c) is an organic peroxide. It is preferable to use as this organic peroxide one having a one minute half-life temperature of between 110 and 185° C. Examples of such organic peroxides include dicumyl peroxide (Percumyl D, from NOF Corporation), 2,5-dimethyl-2,5-di(t-butylperoxy)hexane (Perhexa 25B, from NOF Corporation) and di(2-t-butylperoxyisopropyl)benzene (Perbutyl P, from NOF Corporation). The use of dicumyl peroxide is preferred. Other commercial products include Perhexa C-40, Niper BW and Peroyl L (all from NOF Corporation), and Luperco 231XL (from AtoChem Co.). These may be used singly, or two or more may be used together.

The content of component (c) per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight.

Component (d) is water or an alcohol. The water used as component (d) is not particularly limited, and may be distilled water or tap water. The use of distilled water that is free of impurities is especially preferred.

When an alcohol is used as component (d), the alcohol is not particularly limited; use can be made of a known alcohol. As used herein, "alcohol" refers to a substance having at least one alcoholic hydroxyl group; substances obtained by the condensation polymerization of a polyhydric alcohol having two or more hydroxyl groups are also encompassed here as alcohols. By including an alcohol in the rubber composition, when the rubber composition is vulcanized (cured), a rubber vulcanizate (core) having the desired core hardness profile can be obtained, enabling the ball to fully exhibit a spin rate-reducing effect on shots and thus have an excellent flight performance.

It is especially desirable for the alcohol to be a monohydric, dihydric or trihydric alcohol (an alcohol having one, two or three alcoholic hydroxyl groups). Specific examples include, but are not limited to, methanol, ethanol, propanol, butanol, ethylene glycol, diethylene glycol, propylene glycol, dipropylene glycol, tripropylene glycol and glycerol. The molecular weight of these, although not particularly limited, is preferably less than 200, more preferably less than 150, and even more preferably less than 100.

The above water and alcohol may be used together as component (d).

The amount of component (d) included per 100 parts by weight of the base rubber is preferably at least 0.1 part by weight, and more preferably at least 0.5 part by weight. The upper limit is preferably not more than 10 parts by weight, more preferably not more than 5 parts by weight, and even more preferably not more than 3 parts by weight. When too much component (d) is included, the hardness decreases and it may not be possible to obtain the desired feel on impact, durability and rebound. When too little component (d) is included, the desired core hardness profile may not be obtained and it may not be possible to fully achieve a ball spin rate-lowering effect on shots.

Component (e) is a benzoimidazole of the following general formula (1) and/or a metal salt thereof, and is used as an antioxidant.

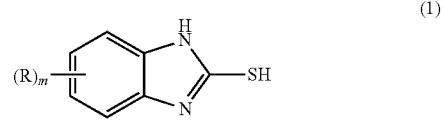

(1)

In formula (1), R is a hydrogen atom or a hydrocarbon group of 1 to 20 carbon atoms and m is an integer from 1 to 4, with each R being the same or different when m is 2 or more. Specific examples of the benzoimidazole of formula (1) include 2-mercaptobenzoimidazole, 2-mercaptomethylbenzoimidazole, and metal salts of these. The metal salts are preferably zinc salts.

The amount of benzoimidazole of the above specific formula and/or metal salt thereof included as component (e) per 100 parts by weight of the base rubber is preferably at least 0.1 part by weight, and more preferably at least 0.3 part by weight. The upper limit is preferably not more than 5 parts by weight, and more preferably not more than 3 parts by weight. When the amount of component (e) included is too small, crosslinking reactions near the core surface may not proceed efficiently, as a result of which the crosslink density may not become sufficiently high and a layer having a high hardness may not fully form. Also, with regard to the overall core, the hardness difference between the core surface and the core center may not become sufficiently large, in addition to which the ball may lack sufficient durability on impact. On the other hand, even when an excessive amount of component (e) is included, the advantageous effects are no better than those obtained with the above-indicated preferred amount of addition.

Aside from above components (a) to (e), various additives such as fillers, organosulfur compounds and processing aids may be included, provided that doing so is not detrimental to the objects of the invention.

Examples of fillers that may be suitably used include zinc oxide, barium sulfate and calcium carbonate. These may be used singly, or two or more may be used together. The filler content per 100 parts by weight of the base rubber may be set to preferably at least 1 part by weight, more preferably at least 3 parts by weight, and even more preferably at least 5 parts by weight. The upper limit in the filler content per 100 parts by weight of the base rubber may be set to preferably not more than 100 parts by weight, more preferably not more than 60 parts by weight, and even more preferably not more than 40 parts by weight. At a filler content that is too high or too low, it may not be possible to obtain a proper weight and a suitable rebound.

The organosulfur compounds are not particularly limited. Examples include thiophenols, thionaphthols, diphenylpolysulfides, halogenated thiophenols, and metal salts of these. Specific examples include the zinc salts of pentachlorothiophenol, pentafluorothiophenol, pentabromothiophenol and p-chlorothiophenol, and any of the following having 2 to 4 sulfur atoms: diphenylpolysulfides, dibenzylpolysulfides, dibenzoylpolysulfides, dibenzothiazoylpolysulfides, dithiobenzoylpolysulfides and 2-thionaphthols. These may be used singly, or two or more may be used together. Of these, preferred use can be made of the zinc salt of pentachlorothiophenol and/or diphenyldisulfide.

It is recommended that the amount of organosulfur compound included per 100 parts by weight of the base rubber be preferably at least 0.05 part by weight, more preferably at least 0.1 part by weight, and even more preferably at least 0.2 part by weight, and that the upper limit be preferably not more than 3 parts by weight, more preferably not more than 2 parts by weight, and even more preferably not more than 1 part by weight. Including too much organosulfur compound may result in a rubber vulcanizate that has too low a hardness. On the other hand, including too little may make a rebound-improving effect unlikely.

Processing aids that may be suitably used include higher fatty acids and metal salts thereof. Examples of higher fatty acids include stearic acid, palmitic acid, oleic acid, linoleic acid, linolenic acid and myristic acid. Stearic acid is especially preferred. Examples of higher fatty acid metal salts include lithium salts, sodium salts, potassium salts, copper salts, magnesium salts, calcium salts, strontium salts, barium salts, tin salts, cobalt salts, nickel salts, zinc salts and aluminum salts. The use of zinc stearate is especially preferred. The amount of processing aid included per 100 parts by weight of the base rubber may be set to preferably at least 1 part by weight, more preferably at least 3 parts by weight, and even more preferably at least 5 parts by weight. The upper limit in this amount of addition per 100 parts by weight of the base rubber may be set to preferably not more than 20 parts by weight, more preferably not more than 15 parts by weight, and even more preferably not more than 10 parts by weight. When too much is added, a sufficient hardness and rebound may not be obtained; when too little is added, the chemicals that are added may not fully disperse and it may not be possible to obtain the expected properties. Examples of methods that may be used to add the processing aid include, but are not particularly limited to: charging the processing aid into a mixer at the same time as other chemicals, adding the processing aid after first mixing it together with other chemicals such as component (b), adding the processing aid after coating it onto the surface of other chemicals such as component (b), and adding the processing aid after first preparing a masterbatch of it together with component (a).

In this invention, a specific antioxidant is used as component (e), but an antioxidant differing from component (e) may be included as component (f). Specific examples of component (f) include hindered phenol-type antioxidants such as 2,6-di-tert-butyl-4-methylphenol, 2,6-di-tert-butyl-4-ethylphenol, pentaerythritol tetrakis[3-(3,5-di-tert-butyl-4-hydroxyphenyl)propionate] and 1,3,5-tris(3',5'-di-t-butyl-4-hydroxybenzyl)isocyanuric acid. Commercial products that can be used include Nocrac 200, Nocrac M-17 (both from Ouchi Shinko Chemical Industry Co., Ltd.), Irganox 1010 (from BASF) and ADK Stab AO-20 (from Adeka). These may be used singly, or two or more may be used together. The amount of this antioxidant included per 100 parts by weight of the base rubber, although not particularly limited, is preferably at least 0.05 part by weight, and more preferably at least 0.1 part by weight. The upper limit is preferably not more than 1.0 part by weight, more preferably not more than 0.7 part by weight, and even more preferably not more than 0.4 part by weight. When too much or too little is included, a proper core hardness gradient may not be obtained, as a result of which it may not be possible to achieve a good rebound, a good durability and a good spin rate-lowering effect on full shots.

A vulcanizate can be produced by vulcanizing/curing the rubber composition for golf balls of the invention. This vulcanizate can be used in particular as part or all of a single-layer or multilayer core. For example, a core which is a vulcanizate can be produced by using a mixing apparatus such as a Banbury mixer or a roll mill to knead the rubber composition, then using a core mold to compression mold or injection mold the kneaded composition and suitably heating the molded body at a temperature suitable for the organic peroxide and co-crosslinking agent to act, such as at between about 100° C. and about 200° C. for a period of 10 to 40 minutes, so as to cure the molded body.

Here, by compounding the ingredients as described above, the vulcanized/cured rubber molding for a golf ball can be conferred with a hardness gradient in which the difference in hardness between the surface and the center thereof is large. By employing this rubber molding for a golf ball as a golf ball core, the durability of the golf ball can be increased while maintaining the good spin properties of the ball.

The core has a center hardness on the JIS-C hardness scale which, although not particularly limited, is preferably at least 40, more preferably at least 45, and even more preferably at least 50. The upper limit is preferably not more than 75, more preferably not more than 70, and even more preferably not more than 65. At a core center hardness outside of this range, the feel on impact may be poor, the durability may decline and it may not be possible to obtain a spin rate-lowering effect.

The core has a surface hardness on the JIS-C hardness scale which, although not particularly limited, is preferably at least 65, more preferably at least 70, and even more preferably at least 72. The upper limit is preferably not more than 95, more preferably not more than 90, and even more preferably not more than 88. When the surface hardness of the core is lower than this range, the ball rebound may decrease, as a result of which a sufficient distance may not be achieved. On the other hand, when the surface hardness of the core is higher than the above range, the feel at impact may be too hard and the durability to cracking on repeated impact may worsen.

The core has a hardness profile such that the hardness difference between the surface and center of the core is sufficiently large. Specifically, the difference in hardness on the JIS-C scale between the surface A and center B of the core, expressed as A−B, is preferably at least 20, more preferably at least 25, and even more preferably at least 30. The upper limit is preferably not more than 50, more preferably not more than 45, and even more preferably not more than 40. When this hardness difference value is too small, the spin rate-lowering effect on shots with a W #1 may be inadequate and a good distance may not be achieved. On the other hand, when this hardness difference is too large, the initial velocity of the ball when struck may become lower, resulting in a shorter distance, or the durability of the ball to cracking on repeated impact may worsen. Here, "center hardness" refers to the hardness measured at the center of the cross-section obtained by cutting the core through the center, and "surface hardness" refers to the hardness measured at the spherical surface of the core. "JIS-C hardness" refers to the hardness measured with a spring-type durometer (JIS-C model) as specified in JIS K 6301-1975.

The core hardness gradient used in this invention is preferably one in which the hardness remains the same or increases, but does not decrease, from the center toward the surface of the core.

It is recommended that the core (vulcanizate) have a compression hardness (deformation) when compressed under a final load of 1,275 N (130 kgf) from an initial load of 98 N (10 kgf) which, although not particularly limited, is preferably at least 2.0 mm, more preferably at least 2.3 mm, and even more preferably at least 2.5 mm, but is preferably not more than 6.0 mm, more preferably not more than 5.5 mm, and even more preferably not more than 5.0 mm. When this value is too large, the core becomes too soft, as a result of which a sufficient spin rate-lowering effect may not be obtained and the resilience may decrease. When this value is too small, a spin rate-lowering effect may not be obtained and the feel of the ball on impact may become hard.

The core diameter, which is not particularly limited and depends also on the layer construction of the golf ball to be produced, is preferably at least 30 mm, and more preferably at least 35 mm, but is preferably not more than 41 mm, and more preferably not more than 40 mm. At a core diameter outside of this range, the initial velocity of the ball may become low or suitable spin properties may not be obtained.

As described above, the foregoing rubber composition is suitably used as a golf ball core. The golf ball of the invention preferably has a structure that includes a core and a cover of one or more layers.

Next, the cover of one or more layers encasing the core is described.

The cover material is not particularly limited, although known materials such as various types of ionomeric resins and thermoplastic polyurethane elastomers used in golf balls may be employed.

To realize an even further spin rate-lowering effect in the ball, it is especially preferable to use a highly neutralized ionomeric material in the layer adjoining the core. Specifically, it is preferable to use a material obtained by blending components (i) to (iv) below:
100 parts by weight of a resin component composed of, in admixture,
  (i) a base resin of (i-1) an olefin-unsaturated carboxylic acid random copolymer and/or a metal ion neutralization product of an olefin-unsaturated carboxylic acid random copolymer mixed with (i-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
  (ii) a non-ionomeric thermoplastic elastomer in a weight ratio between 100:0 and 50:50;
  (iii) from 5 to 80 parts by weight of a fatty acid and/or fatty acid derivative having a molecular weight of from 228 to 1,500; and
  (iv) from 0.1 to 17 parts by weight of a basic inorganic metal compound capable of neutralizing un-neutralized acid groups in components (i) and (iii).
In particular, when using a mixed material of components (i) to (iv), it is preferable to utilize one in which at least 70% of the acid groups are neutralized.

The material making up the outermost layer of the cover is preferably one composed primarily of a urethane material, especially a thermoplastic urethane elastomer.

One or more cover layer (intermediate layer) may be formed between the layer adjoining the core and the outermost cover layer. In this case, it is preferable to use a thermoplastic resin such as an ionomer as the intermediate layer material.

To obtain the cover in this invention, use may be made of, for example, a method that involves placing within a mold a single-layer core or a multilayer core of two or more layers that has been prefabricated according to the type of ball, mixing and melting the above mixture under applied heat, and injection-molding the molten mixture over the core so as to encase the core with the desired cover. The cover producing operations in this case can be carried out in a state where excellent thermal stability, flowability and processability are assured. As a result, the golf ball ultimately obtained has a high rebound, and moreover has a good feel on impact and excellent scuff resistance. Alternatively, use may be made of a cover-forming method other than the foregoing, such as one in which, for example, a pair of hemispherical half-cups are molded beforehand from the cover material described above, following which the core is enclosed within the half-cups and molding is carried out under applied pressure at between 120° C. and 170° C. for a period of 1 to 5 minutes.

When the cover has only one layer, the thickness of that layer may be set to from 0.3 to 3 mm. When the cover has two layers, the thickness of the outer cover layer may be set to from 0.3 to 2.0 mm and the thickness of the inner cover layer (intermediate layer) may be set to from 0.3 to 2.0 mm. The Shore D hardnesses of the respective layers making up the cover (cover layers), although not particularly limited, are set to preferably at least 40, and more preferably at least 45. The upper limit is preferably not more than 70, and more preferably not more than 65.

Numerous dimples are formed on the surface of the outermost layer of the cover. In addition, the cover may be subjected to various types of treatment, such as surface preparation, stamping and painting. In cases where such surface treatment is imparted to the cover formed of the above cover material, the good moldability of the cover surface enables the work to be carried out efficiently.

The present invention provides a golf ball in which the above rubber composition is used as the core material for at least one core layer. With regard to the type of golf ball, this rubber composition may be used without particular limitation in golf balls having a core and one or more cover layer, including solid golf balls such as two-piece or three-piece solid golf balls in which the solid core is encased by the cover and multi-piece golf balls having at least a three-layer construction, and also wound golf balls in which a wound core is encased by a single-layer cover or a cover having a multilayer construction of two or more layers.

EXAMPLES

Working Examples and Comparative Examples are given below by way of illustration, although the invention is not limited by the following Examples.

Working Examples 1 to 8, Comparative Examples 1 to 4

Cores having a diameter of 38.6 mm were produced by using the core materials composed primarily of polybutadiene shown in Table 1 below to prepare core compositions formulated for Working Examples 1 to 8 and Comparative Examples 1 to 4, subsequently vulcanizing the compositions at 155° C. for 20 minutes, and then abrading the core surface.

Antioxidant (1): Available under the trade name "Nocrac 200" from Ouchi Shinko Chemical Industry Co., Ltd.
Antioxidant (2): Available under the trade name "Nocrac NS-6" from Ouchi Shinko Chemical Industry Co., Ltd.
Zinc salt of pentachlorothiophenol:
  Available from Wako Pure Chemical Industries, Ltd.
Zinc oxide: Available as "Zinc Oxide Grade 3" from Sakai Chemical Co., Ltd.
Cross-Sectional Hardnesses of Core
  The cross-sectional hardnesses at various positions, including the surface and center, of the 38.6 mm diameter core in each of the above Working Examples and Comparative Examples were measured by the following methods.
(1) Surface Hardness of Core
  At a temperature of 23±1° C., the hardnesses at four random points on the core surface were measured with a JIS-C durometer by perpendicularly setting the indenter of the durometer against the spherical surface of the core. The average value of these measurements was treated as the

TABLE 1

| Rubber formulation | | Working Example | | | | | | | | Comparative Example | | | |
|---|---|---|---|---|---|---|---|---|---|---|---|---|---|
| (parts by weight) | | 1 | 2 | 3 | 4 | 5 | 6 | 7 | 8 | 1 | 2 | 3 | 4 |
| Component (a) | Polybutadiene rubber | 100 | 100 | 100 | 100 | 100 | 100 | 100 | 100 | 100 | 100 | 100 | 100 |
| Component (b) | Zinc acrylate | 26 | 36 | 26 | 26 | 26 | 26 | 26 | 26 | 40 | 36 | 25 | 21 |
| Component (c) | Organic peroxide | 1 | 1 | 1 | 1 | 1 | 1 | 1 | 1 | 1 | 1 | 1 | 1 |
| Component (d) | Propylene glycol | 1 | | | | 1 | | 1 | 1 | | | | |
| | Water | | 1 | | | | 1 | | | 1 | 1 | | |
| | Diethylene glycol | | | 1 | | | | | | | | | |
| | 1-Butanol | | | | 1 | | | | | | | | |
| Component (e) | Antioxidant (I) | 0.3 | 0.3 | 0.3 | 0.3 | | | | 0.5 | | | | 0.3 |
| | Antioxidant (II) | | | | | 0.3 | 0.3 | | | | | | |
| | Antioxidant (III) | | | | | | | 0.3 | | | | | |
| Component (f) | Antioxidant (1) | | | | | | | | 0.2 | | | | |
| | Antioxidant (2) | | | | | | | | | | 0.2 | 0.2 | |
| Component (g) | Zinc salt of pentachlorothiophenol | | | | | | | | 0.2 | | | | |
| Other ingredients | Zinc oxide | 21.1 | 17.0 | 21.1 | 21.1 | 21.1 | 21.1 | 21.1 | 21.1 | 15.4 | 17.0 | 21.4 | 23.0 |

Details on the above formulations are given below.
Polybutadiene: Available under the trade name "BR 01" from JSR Corporation
Zinc acrylate: Available under the trade name "ZN-DA85S" (85% zinc acrylate/15% zinc stearate) from Nippon Shokubai Co., Ltd.
Organic Peroxide (Dicumyl peroxide):
  available under the trade name "Percumyl D" from NOF Corporation
Propylene glycol (a dihydric alcohol):
  molecular weight, 76.1 (from Hayashi Pure Chemical Ind., Inc.)
Diethylene glycol (a dihydric alcohol):
  molecular weight, 106.1 (from Hayashi Pure Chemical Ind., Inc.)
1-Butanol (a monohydric alcohol):
  molecular weight, 74.1 (from Tokyo Chemical Industry Co., Ltd.)
Antioxidant (I): Available under the trade name "Nocrac MB" from Ouchi Shinko
  Chemical Industry Co., Ltd.
Antioxidant (II): Available under the trade name "Nocrac MMB" from Ouchi Shinko Chemical Industry Co., Ltd.
Antioxidant (III): Available under the trade name "Nocrac MBZ" from Ouchi Shinko Chemical Industry Co., Ltd.

measured value for one core, and the average value for three measured cores was determined. These results are presented in Table 3.
(2) Cross-Sectional Hardnesses of Core
  The core was cut through the center to obtain a flat cross-sectional plane. At a temperature of 23±1° C., the hardnesses at the center of the hemispherical core and at 2 mm intervals from the center toward the surface were measured with a JIS-C durometer by perpendicularly setting the indenter of the durometer against the flat cross-section, thereby collecting the measurements for one core. The average values for three measured cores were determined. Those results are presented in Table 3.
Compressive Hardnesses of Core and Ball
  The compressive hardnesses (deformation) (mm) of each core and ball when compressed under a final load of 1,275 N (130 kgf) from an initial load of 98 N (10 kgf) was measured at a temperature of 23±1° C. In each case, the average value for ten measured cores or balls was determined.
Formation of Cover (Intermediate Layer and Outermost Layer)
  Using an injection mold, the intermediate layer material (ionomeric resin material) shown in Table 2 was then injection-molded over the surface of the above core, thereby forming an intermediate layer having a thickness of 1.25 mm and a Shore D hardness of 64. Next, using a different injection mold, the outermost layer material (urethane resin material) shown in Table 2 was injection-molded over the intermediate layer-encased sphere, thereby forming an outermost layer having a thickness of 0.8 mm and a Shore D hardness of 41.

TABLE 2

| Formulation (pbw) | Intermediate layer | Outermost layer |
|---|---|---|
| Himilan 1706 | 35 | |
| Himilan 1557 | 15 | |
| Himilan 1605 | 50 | |
| TPU | | 100 |
| Polyethylene wax | | 1.0 |
| Isocyanate compound | | 6.3 |
| Titanium oxide | | 3.3 |
| Trimethylolpropane | | 1.1 |

Details on the compounding ingredients in the table are given below.

Himilan 1706, Himilan 1557, Himilan 1605:
  Ionomeric resins available from DuPont-Mitsui Polychemicals Co., Ltd.
TPU: An ether type-thermoplastic polyurethane available under the trade name "Pandex" from DIC Covestro Polymer, Ltd.; Shore D hardness, 41
Polyethylene wax: Available under the trade name "Sanwax 161P" from Sanyo Chemical Industries, Ltd.
Isocyanate compound: 4,4'-Diphenylmethane diisocyanate The spin rates of the resulting golf balls on shots with a driver were evaluated by the following method. The results are shown in Table 3.

Spin Rate on Shots with a Driver

A driver (W #1) was mounted on a golf swing robot and the spin rate of the ball immediately after being struck at a head speed of 45 m/s was measured using an apparatus for measuring the initial conditions. The club used was the TourB XD-3 Driver (2016 model; loft angle, 9.5°) manufactured by Bridgestone Sports Co., Ltd.

Durability

The durability of the golf ball was evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates was set to 43 m/s. The number of shots required for the golf ball to crack was measured, and the average value of the measurements taken for ten golf balls was calculated. Durability values for the balls in the respective Examples were calculated relative to an arbitrary index of 100 for the average number of shots required for the ball obtained in Comparative Example 1 to crack.

TABLE 3

| | | Working Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| Core | Compressive hardness (mm) | 4.01 | 3.92 | 4.08 | 4.02 | 3.97 | 3.88 | 4.07 | 4.16 | 4.03 | 3.98 | 4.05 | 3.85 |
| Hardness profile (JIS-C) | Center hardness (B) | 54.2 | 53.9 | 53.2 | 53.5 | 53.8 | 54.3 | 53.3 | 53.4 | 53.1 | 55.6 | 56.6 | 57.4 |
| | Hardness 2 mm from center | 54.9 | 55.1 | 54.3 | 54.6 | 55.0 | 55.3 | 54.4 | 54.1 | 54.3 | 56.7 | 56.9 | 57.7 |
| | Hardness 4 mm from center | 55.8 | 57.1 | 55.2 | 55.5 | 55.9 | 56.8 | 55.8 | 55.0 | 55.9 | 57.7 | 57.1 | 57.9 |
| | Hardness 6 mm from center | 56.3 | 58.2 | 57.0 | 57.4 | 57.0 | 58.6 | 57.1 | 55.5 | 57.4 | 58.8 | 58.0 | 58.8 |
| | Hardness 8 mm from center | 57.8 | 59.9 | 58.4 | 58.8 | 58.2 | 59.9 | 58.5 | 57.0 | 58.7 | 59.5 | 59.2 | 60.0 |
| | Hardness 10 from center | 60.0 | 60.5 | 59.4 | 59.8 | 60.2 | 60.7 | 60.2 | 59.2 | 59.7 | 60.1 | 61.5 | 62.3 |
| | Hardness 12 mm from center | 65.7 | 61.6 | 65.1 | 65.4 | 65.8 | 62.0 | 65.2 | 64.9 | 60.8 | 61.2 | 64.2 | 65.0 |
| | Hardness 14 mm from center | 70.8 | 65.3 | 70.2 | 70.6 | 71.0 | 65.7 | 70.3 | 70.0 | 64.5 | 64.9 | 68.7 | 69.5 |
| | Hardness 16 mm from center | 75.8 | 77.2 | 74.6 | 76.2 | 76.0 | 77.6 | 75.2 | 75.0 | 75.2 | 76.8 | 70.4 | 71.5 |
| | Hardness 18 mm from center | 79.0 | 80.4 | 77.5 | 78.8 | 78.1 | 80.6 | 77.6 | 78.2 | 76.7 | 79.2 | 70.8 | 73.1 |
| | Surface hardness (A) | 80.4 | 81.3 | 79.7 | 80.1 | 80.4 | 82.2 | 79.3 | 79.1 | 76.8 | 79.9 | 70.5 | 73.9 |
| | Hardness difference (A-B) | 26.2 | 27.4 | 26.5 | 26.6 | 26.6 | 27.9 | 26.0 | 25.7 | 23.7 | 24.3 | 13.9 | 16.6 |

TABLE 3-continued

| | | Working Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| Ball | Compressive hardness (mm) | 3.24 | 3.16 | 3.31 | 3.25 | 3.21 | 3.13 | 3.30 | 3.38 | 3.26 | 3.22 | 3.30 | 3.14 |
| | Spin rate on driver shots (rpm) | 2,103 | 2,136 | 2,063 | 2,098 | 2,127 | 2,169 | 2,079 | 2,026 | 2,322 | 2,131 | 2,748 | 2,765 |
| | Durability | 103 | 101 | 103 | 102 | 102 | 101 | 100 | 101 | 100 | 78 | 109 | 108 |

As is apparent from Table 3, relative to Comparative Example 1 as the reference, each of the golf balls in Working Examples 1 to 8 had a large hardness difference between the core surface and center and, while maintaining a good durability, had a reduced spin rate on shots with a driver. Hence, these golf balls had improved spin performances.

By contrast, the golf ball in Comparative Example 2 had a large hardness difference between the core surface and center and the spin rate on shots with a driver did decrease somewhat, but a large decline in durability was observed.

In Comparative Examples 3 and 4, a good durability was maintained, but the hardness difference between the core surface and center was smaller, resulting in an increased spin rate on shots with a driver.

Japanese Patent Application No. 2018-121983 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A constituent member of a golf ball comprising a vulcanized form of a rubber composition comprising:
    (a) a base rubber,
    (b) a co-crosslinking agent which is an α,β-unsaturated carboxylic acid or a metal salt thereof or both,
    (c) an organic peroxide,
    (d) an alcohol which is butanol, glycerol, ethylene glycol or propylene glycol, and
    (e) an antioxidant which is a benzoimidazole of the following general formula (1) or a metal salt thereof or both

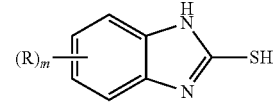

(wherein R is a hydrogen atom or a hydrocarbon group of 1 to 20 carbon atoms and m is an integer from 1 to 4, with each R being the same or different when m is 2 or more).

2. The constituent member of a golf ball of claim 1, wherein the amount of component (d) is from 0.5 to 5 parts by weight per 100 parts by weight of component (a).

3. The constituent member of a golf ball of claim 1, wherein component (e) is selected from the group consisting of 2-mercaptobenzoimidazole, 2-mercaptomethylbenzoimidazole, and metal salts thereof.

4. The constituent member of a golf ball of claim 1, further comprising (f) an antioxidant differing from component (e).

5. The constituent member of a golf ball of claim 4, wherein component (f) is a hindered phenol-type antioxidant.

6. The constituent member of a golf ball of claim 1, further comprising (g) an organosulfur compound.

7. The constituent member of a golf ball of claim 1, wherein the vulcanized rubber composition has a surface and a center with a hardness difference therebetween of at least 25 on the JIS-C hardness scale.

8. A golf ball comprising a core of one or more layers, wherein part or all of the constituent core layers is a constituent member of claim 1.

* * * * *